United States Patent [19]
Wilkinson

[11] Patent Number: 5,938,014
[45] Date of Patent: Aug. 17, 1999

[54] CONTAINER WITH REMOVABLE EYEGLASSES

[75] Inventor: Roger D. Wilkinson, New Fairfield, Conn.

[73] Assignee: Kraft Foods, Inc., Northfield, Ill.

[21] Appl. No.: 09/028,976

[22] Filed: Feb. 25, 1998

[51] Int. Cl.[6] .................................................. B65D 77/00
[52] U.S. Cl. ........................... 206/216; 446/27; D16/306
[58] Field of Search ........................... 206/216; 351/158; D16/306; 446/27, 448

[56] References Cited

U.S. PATENT DOCUMENTS

| D. 341,367 | 11/1993 | Jones et al. ............................... D16/306 |
| 2,085,414 | 6/1937 | Cavanagh ..................................... 46/11 |
| 2,116,411 | 5/1938 | Philipson .................................... 446/27 |
| 2,323,518 | 7/1943 | Cochran ....................................... 88/41 |
| 2,714,448 | 8/1955 | Brown ........................................ 206/216 |
| 2,824,308 | 2/1958 | Duncan .......................................... 2/14 |
| 3,303,603 | 2/1967 | Abeson ........................................ 46/11 |
| 4,558,528 | 12/1985 | Cunningham ............................. 40/365 |
| 4,560,258 | 12/1985 | Stanley et al. .......................... 351/115 |
| 4,776,686 | 10/1988 | Stanley et al. .......................... 351/115 |
| 4,974,953 | 12/1990 | Von Braunhut ........................... 351/45 |
| 5,156,266 | 10/1992 | Sykora .................................... 206/216 |

*Primary Examiner*—Paul T. Sewell
*Assistant Examiner*—J. Mohandesi
*Attorney, Agent, or Firm*—Thomas R. Savoie; Thomas A. Marcoux

[57] ABSTRACT

A foldable flat sheet includes eyeglasses formed therein and which may be folded to construct a container, such as a rectangular-shaped sleeve. The foldable flat sheet is constructed with fold lines, the point where the temple bars of the eyeglasses join the eye aperture portion being positioned at these fold lines to allow the eyeglasses to be easily fitted to the wearer's face upon removal from the container. The eyeglasses may be constructed to allow 3-dimensional viewing therethrough.

21 Claims, 2 Drawing Sheets

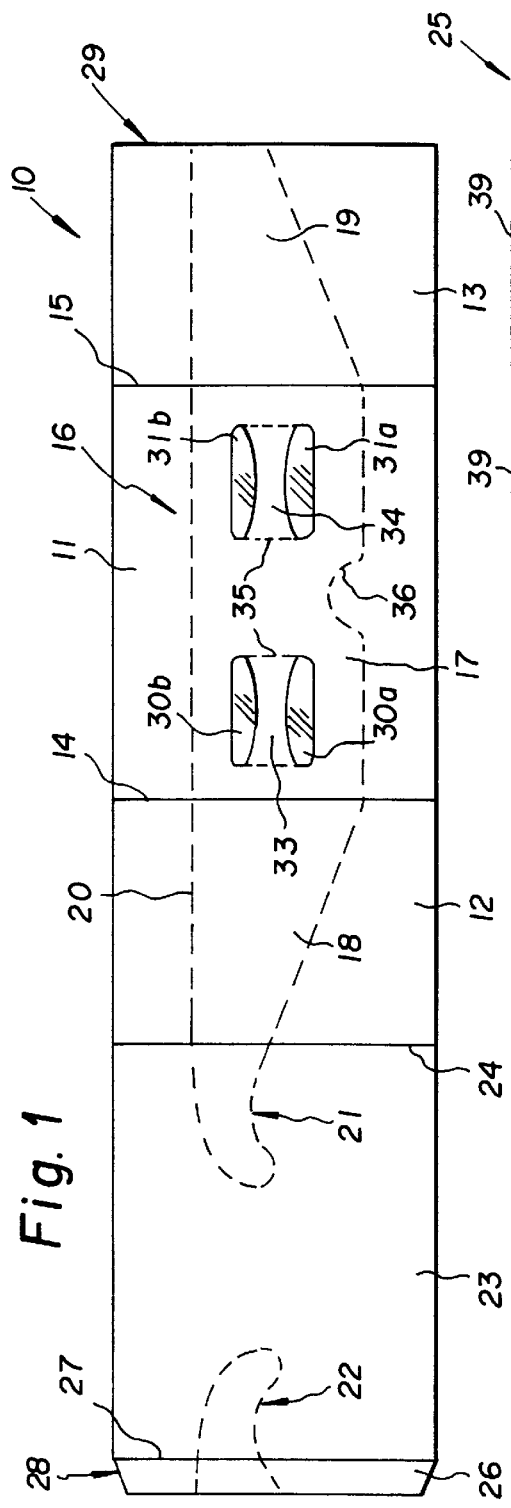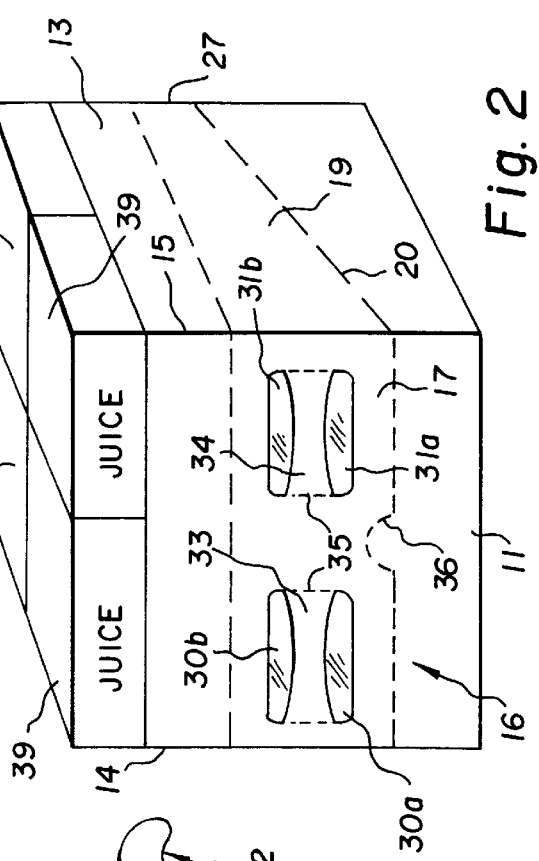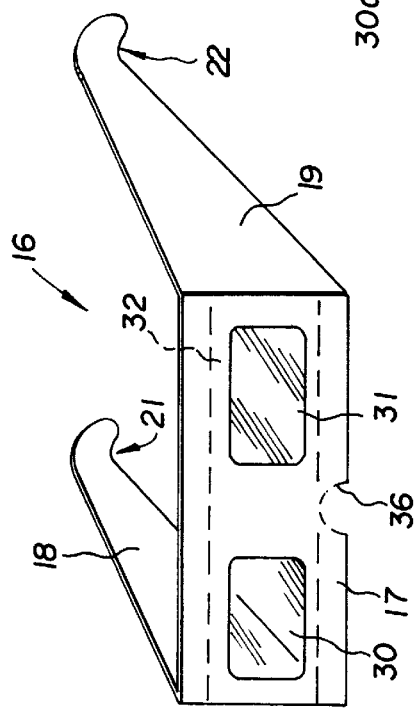

CONTAINER WITH REMOVABLE EYEGLASSES

FIELD OF THE INVENTION

The present invention relates to a container, or sleeve, including eyeglasses constructed as a part thereof and, more particularly, to a container in which the eyeglasses are removable and constructed such that the temple bars are connected to the eye aperture portion at fold lines of the container and can be easily fitted to the face of the wearer upon removal of the eyeglasses from the container.

BACKGROUND OF THE INVENTION

It is known in the art to construct a container with a product, such as a toy, formed as part of the container, the product being removable therefrom. For example, U.S. Pat. No. 2,714,448 to Brown discloses a container combined with a detachable phonograph record and stereoscopic device, i.e., eyeglasses. In the Brown container, the eyeglasses are formed in a side panel and cannot fit the wearer and/or be worn immediately upon removal from the container. U.S. Pat. No. 5,156,266 to Sykora discloses a foldable container blank which includes a pair of dark eyeglasses attached to a peripheral tab portion. In Sykora, the eyeglasses include temple bars which are bent at the point of attachment to the eye aperture portion. The temple bars are not fixed to the remainder of the container, but instead are movable with respect thereto and may be accidentally bent or broken.

Further, assembly of the container is fairly complex, requiring the attachment of numerous peripheral tab portions to one another.

SUMMARY OF THE INVENTION

Thus, it is the purpose of the present invention to provide a new and improved container with improved removable eyeglasses. This purpose is achieved by providing a container having at least two parallel fold lines at opposite sides of a first section of the container, with second sections on the sides of the container beyond the fold lines. The eyeglass aperture portion is formed in the first flat section and the temple bars are connected thereto at the fold lines and formed in the side sections.

In accordance with a preferred embodiment of the invention, the container may be formed from a foldable flat sheet which includes a first, or front section positioned between two second, or side sections, the front section being separated from the side sections by parallel fold lines. Eyeglasses are formed in the foldable flat sheet. The eyeglasses include an eye aperture portion which is formed in the front section and a pair of temple bars formed in respective side sections such that each of the temple bars joins the eye aperture portion at a fold line.

The container, as herein defined, may completely enclose a product or it may comprise a partial or complete tubular shape forming a sleeve with open top and bottom ends which partially or completely wraps around a product.

Preferably the eyeglasses are defined by perforations in the foldable flat sheet. The eyeglasses may also include lenses which allow 3-dimensional viewing therethrough.

It is, therefore, an object of the present invention to provide an improved container having eyeglasses formed therein, the temple bars of the eyeglasses being separated from the eye aperture portion by the fold lines such that the eyeglasses are ready to be worn upon removal from the remainder of the container.

It is a further object of the invention to provide a foldable flat sheet for forming the container having eyeglasses formed therein defined by perforations for ease of removal.

It is another object of the invention to provide a container having eyeglasses formed therein which include lenses for allowing 3-dimensional viewing.

These and other objects of the present invention will become apparent from the detailed description to follow.

BRIEF DESCRIPTION OF THE DRAWINGS

There follows a detailed description of the preferred embodiments of the invention which are to be taken together with the accompanying drawings, wherein:

FIG. 1 is a front view of a foldable flat sheet according to the invention;

FIG. 2 is a perspective view of a product to which a container in the form of a sleeve including removable eyeglasses has been attached;

FIG. 4 is a perspective view of the eyeglasses after removal from the container or foldable flat sheet of the invention.

DESCRIPTION OF THE PREFERRED EMBODIMENTS

Figure 3:
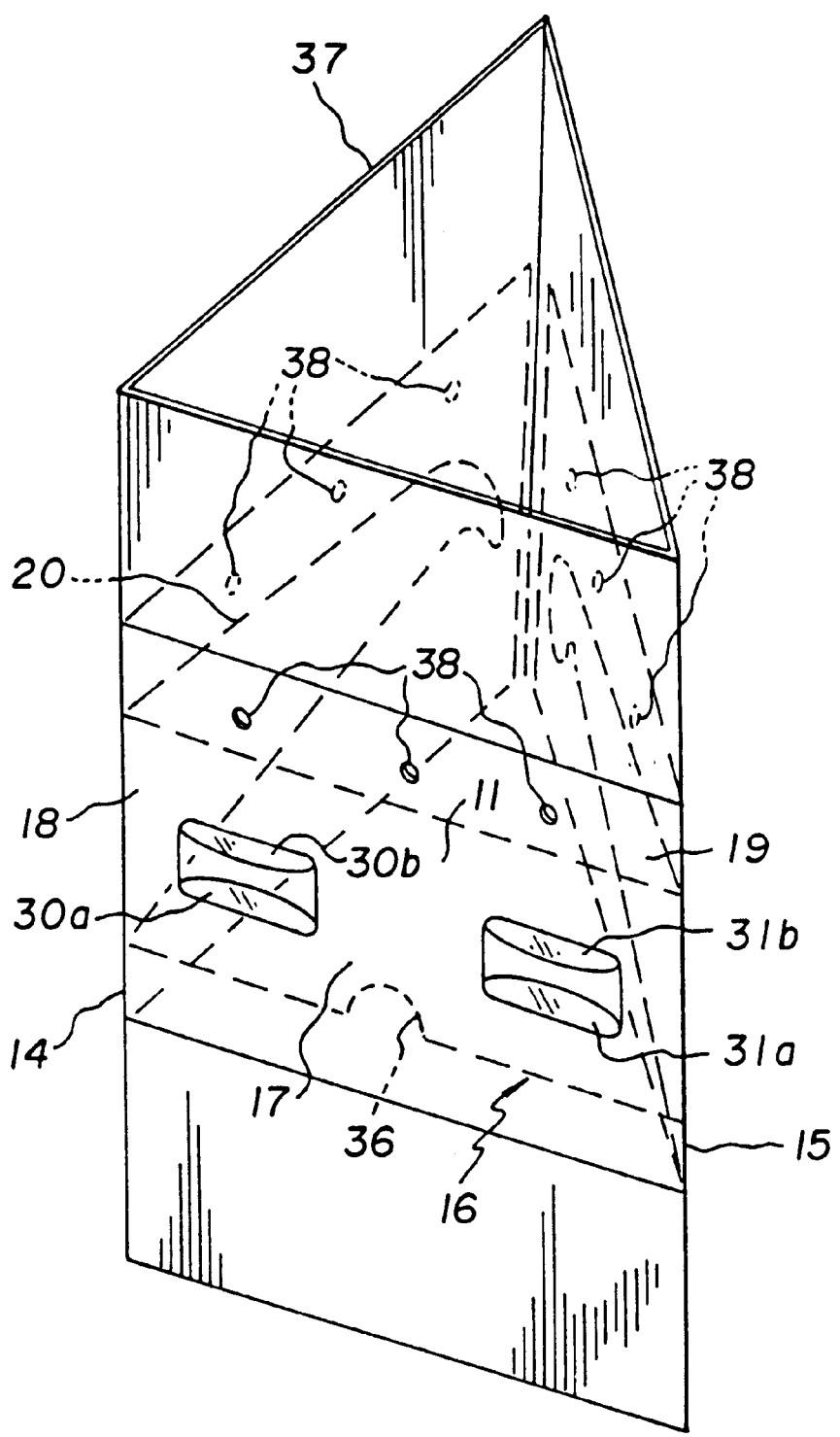
FIG. 3 is a perspective view showing other embodiments and variations of the invention.

Referring now to the figures, like elements are represented by like numerals throughout the several views.

FIG. 1 shows a foldable flat sheet 10 for forming a container, the container being described in greater detail below in connection with FIGS. 2 and 3. The foldable flat sheet 10 includes a first, or front section 11 which is positioned between two second, or side sections 12,13. The front section 11 is separated from the two side sections 12,13 by parallel fold lines 14,15. Depending on the size and shape of the container which is to be formed from the foldable flat sheet 10, it may be necessary to include a rear section 23 as described in connection with FIG. 2.

Eyeglasses 16 are formed in the foldable flat sheet 10. The eyeglasses 16 include a frame with openings for receiving lenses. The front part of the frame is referred to herein as the eye aperture portion 17, and is formed in the front section 11 of the foldable flat sheet 10. The side portions of the frame are referred to herein as temple bars 18,19, and are formed in the two side sections 12,13. The temple bars 18,19 are secured to the eye aperture portion 17 at fold lines 14,15, such that the temple bars 18,19 are readily bendable with respect to the eye aperture portion 17. Thus, upon removal of the eyeglasses 16 from the remainder of the foldable flat sheet 10, the temple bars 18,19 may be identically bent with respect to the eye aperture portion 17 in the correct position to easily fit a wearer's face. The temple bars 18,19 may also be folded flat against the back side of the eye aperture portion 17, as would be done with conventional eyeglasses before insertion into a carrying case. The foldable flat sheet should, therefore, be constructed from cardboard or other sturdy material, so that the temple bars 18,19 will not tear at the fold lines.

In the preferred embodiment, rear section 23 is attached to one of the two side sections (side section 12 as shown) and separated therefrom by a fold line 24. Preferably, rear section 23 and front section 11 are approximately the same width, and side sections 12,13 are approximately the same width such that the foldable flat sheet 10 may be formed into a rectangular shaped sleeve 25 as shown in FIG. 2 for receiving a product 39, such as small packs of juice. In this regard, it is preferable that the foldable flat sheet 10 include a lip portion 26 attached by a fold line 27 to one of the open edges 28,29 of the foldable flat sheet 10 for attachment to the back side of the other open edge 28,29 via an adhesive or other means, to thereby form an enclosed sleeve.

An alternative to this configuration (not shown) is to divide the rear section 23 into two separate portions, e.g., halves, attached to respective side sections 12,13 at fold lines and then secure the two portions together to form a rectangular sleeve having a seam in the back, rather than at fold line 27 as shown in FIG. 2.

Although the container is depicted as a rectangular-shaped sleeve 25 in FIG. 2, i.e., a complete tubular shape, the container could be triangular-shaped by using only three sections (e.g., sections 11,12,13). Further, the foldable flat sheet could be constructed to include any number of sections to form a multi-walled container, provided that the sections have an appropriate size to allow the eyeglasses 17 to fit a wearer's face. As an alternative to foldable flat sheet 10, the container may be formed in the desired shape through extrusion or other known processes.

Preferably, the eyeglasses 16 are defined by perforations 20 in the foldable flat sheet 10. These perforations 20 allow for easy removal of the eyeglasses 16 from the foldable flat sheet 10. The eyeglasses 16 may further include hooked portions 21, 22 at the ends of temple bars 18,19, respectively, for securing the eyeglasses 17 over a wearer's ears. In the foldable flat sheet 10 shown in FIG. 1, the size is such that the hooked portions extend onto the rear section 23. However, if only three sections are used, then the side sections are proportioned so as to accommodate hooked portions 21,22 thereon. The perforations 20 are also formed in the lip portion 26 to allow for removal of the eyeglasses 16 from the FIG. 2 sleeve 25, while retaining the shape of sleeve 25.

In the embodiments described above, the foldable flat sheet 10 is formed into a container having a complete tubular shape, i.e., an enclosed sleeve. However, the foldable flat sheet 10 may also be formed into an open container having a partial tubular shape, i.e., an open sleeve, which may be affixed to another container or product 37, similar to a label, as shown in FIG. 3. In this configuration, the foldable flat sheet 10 may be affixed to container 37 by adhesive, or other means, at points 38 outside the eyeglasses 16 so that the eyeglasses may easily be removed from the container 37 leaving the remainder of the foldable flat sheet 10 affixed to the container 37 to serve as a label. If the foldable flat sheet is formed as an enclosed sleeve, then the open top and bottom ends may be sealed by removable or fixed lids, which may also be formed as part of the foldable flat sheet, to form an enclosed container.

FIG. 4 shows the eyeglasses 16 after removal from the container 25. In the preferred embodiment, the eye aperture portion 17 includes a pair of openings 30,31 conforming to a user's eyes when the eyeglasses 16 are worn. However, the eye aperture portion could be constructed with a single opening (not shown) extending across the width of the user's eyes. Moreover, openings 30,31 may be of any shape, e.g., rectangular, oval or round.

Openings 30,31 may also receive any type of lenses. In a preferred embodiment, a material piece constructed of a suitable material to allow 3-dimensional viewing is placed in the openings 30,31. The material piece may, for example, be a coated polyester film 32 affixed to a rear side of aperture portion 17 by an adhesive or other means.

In order to maintain the integrity of the openings 30,31, as well as the coated polyester film 32 or any other material piece used to construct lenses for openings 30,31, pieces 33,34 of the foldable flat sheet 10 are maintained across openings 30,31 in a direction extending between fold line 14 and fold line 15 thereby forming two slits 30a, 30b and 31a, 31b in each opening 30,31. Preferably, pieces 33,34 are attached to the eye aperture portion 17 by perforations 35 for ease of removal therefrom. The eyeglasses 16, though shown with an essentially rectangular shape, may have a more rounded or fanciful shape, similar to any of the eyeglass frames available on the market.

Although the invention has been described in considerable detail with respect to preferred embodiments thereof, variations and modifications will be apparent to those skilled in the art without departing from the spirit and scope of the invention as set forth in the claims.

I claim:

1. A foldable flat sheet for forming a container comprising:
a front section positioned between two side sections, said front section being separated from said side sections by parallel fold lines; and eyeglasses comprising a rectangular-shaped eye aperture portion and a pair of temple bars, one end of each of said temple bars having a same length as a respective side of said eye aperture portion and adjoining the respective side along the full length thereof, said eye aperture portion being formed in said front section of said foldable flat sheet, each of said temple bars being formed in a respective one of said two side sections, said ends of said temple bars being positioned at said fold lines such that said temple bars are separated from said eye aperture portion by said fold lines, whereby when said eyeglasses are removed from a remainder of said foldable flat sheet, said temple bars are readily bendable with respect to the eye aperture portion such that they are wearable on a user's face and are foldable inwardly over a back side of said front section.

2. The foldable flat sheet according to claim 1 wherein said eyeglasses are defined by perforations in said foldable flat sheet.

3. The foldable flat sheet according to claim 2 wherein said eye aperture portion comprises a pair of openings for conforming to a user's eyes when said eyeglasses are worn.

4. The foldable flat sheet according to claim 3 wherein each of said openings is formed as two slits separated by a piece of said foldable flat sheet extending in a direction between said fold lines for maintaining integrity of said openings prior to removal of said eyeglasses from the remainder of said foldable flat sheet, said pieces of foldable flat sheet being attached to said eyeglasses by perforations.

5. The foldable flat sheet according to claim 1 further comprising a material piece positioned in said eye aperture portion for enabling three dimensional viewing therethrough.

6. The foldable flat sheet according to claim 5 wherein said material piece comprises a coated polyester film.

7. The foldable flat sheet according to claim 1 wherein said temple bars further include hooked portions at ends opposite ends connected to said eye aperture portions for fitting over a user's ears.

8. The foldable flat sheet according to claim 1 further comprising a rear section positioned adjacent one of said two side sections, said rear section being separated from said adjacent side section by a fold line parallel to said remaining fold lines, whereby a rectangular shaped sleeve is formed by bending adjacent sections inwardly along said fold lines and affixing said rear section to the other side section.

9. A container comprising:
   at least three walls forming at least a partially enclosed tube with an open top end and an open bottom end, said three walls comprising two side walls and a front wall positioned therebetween, adjacent walls being separated by fold lines; and
   eyeglasses comprising a rectangular-shaped eye aperture portion and a pair of temple bars, one end of each of said temple bars having a same length as a respective side of said eye aperture portion and adjoining the respective side along the full length thereof, said eye aperture portion being formed in said front wall, each of said temple bars being formed in a respective one of said two side walls, said ends of said temple bars being positioned at said fold lines such that said temple bars are separated from said eye aperture portion by said fold lines, whereby when said eyeglasses are removed from a remainder of said foldable flat sheet, said temple bars are readily bendable with respect to the eye aperture portion such that they are wearable on a user's face and are foldable inwardly over a back side of said front section.

10. The container according to claim 9 further comprising a rear wall positioned between said two side walls.

11. The container according to claim 10 wherein said tube has a rectangular shape.

12. The container according to claim 9 wherein said eyeglasses are defined by perforations in said walls.

13. The container according to claim 12 wherein said walls and said eyeglasses comprise cardboard.

14. The container according to claim 9 further comprising a material piece positioned in said eye aperture portion for enabling three dimensional viewing therethrough.

15. The container according to claim 9 wherein said temple bars further include hooked portions at ends opposite ends connected to said eye aperture portions for fitting over a user's ears.

16. The container according to claim 9 wherein said tube comprises a complete tubular shape.

17. The container according to claim 16 further comprising a bottom wall for closing said bottom end.

18. The container according to claim 17 further comprising a top lid for closing said top end.

19. A container for holding a product comprising:
   an enclosed sleeve having a rectangular shape and open at top and bottom ends for surrounding a product, said sleeve comprising two substantially parallel side sections and substantially parallel front and rear sections positioned between said two side sections, adjacent sections being separated by fold lines; and
   eyeglasses comprising a rectangular-shaded eye aperture portion and a pair of temple bars, one end of each of said temple bars having a same length as a respective side of said eye aperture portion and adjoining the respective side alone the full length thereof, said eye aperture portion being formed in said front section, each of said temple bars being formed in a respective one of said two side sections, said ends of said temple bars being positioned at said fold lines such that said temple bars are separated from said eye aperture portion by said fold lines, whereby when said eyeglasses are removed from a remainder of said foldable flat sheet, said temple bars are readily bendable with respect to the eye aperture portion such that they are wearable on a user's face and foldable inwardly over a back side of said front section.

20. The container according to claim 19 wherein said temple bars further include hooked portions at ends opposite ends connected to said eye aperture portions for fitting over a user's ears, said hooked portions being formed in said rear section.

21. A foldable flat sheet for forming a container comprising:
   a front section positioned between two side sections, said front section being separated from said side sections by parallel fold lines; and
   eyeglasses comprising an eye aperture portion and a pair of temple bars, said eye aperture portion being formed in said front section of said foldable flat sheet and comprising a pair of openings for conforming to a user's eyes when said eyeglasses are worn, each of said openings being formed as two slits separated by a piece of said foldable flat sheet extending in a direction between said fold lines for maintaining integrity of said openings prior to removal of said eyeglasses from the remainder of said foldable flat sheet, said pieces of foldable flat sheet being attached to said eyeglasses by perforations, each of said temple bars being formed in a respective one of said two side sections, said temple bars being separated from said eye aperture portion by said fold lines, whereby when said eyeglasses are removed from a remainder of said foldable flat sheet, said temple bars are readily bendable with respect to the eye aperture portion such that they are wearable on a user's face and are foldable inwardly over a back side of said front section.

* * * * *